(12) United States Patent
Ekdahl

(10) Patent No.: US 10,994,737 B2
(45) Date of Patent: May 4, 2021

(54) METHOD FOR CONTROLLING A TURBOCHARGER SYSTEM OF A COMBUSTION ENGINE IN A VEHICLE

(71) Applicant: VOLVO TRUCK CORPORATION, Gothenburg (SE)

(72) Inventor: Niklas Ekdahl, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/770,548

(22) PCT Filed: Dec. 7, 2017

(86) PCT No.: PCT/EP2017/081865
§ 371 (c)(1),
(2) Date: Jun. 5, 2020

(87) PCT Pub. No.: WO2019/110108
PCT Pub. Date: Jun. 13, 2019

(65) Prior Publication Data
US 2020/0369276 A1   Nov. 26, 2020

(51) Int. Cl.
*B60W 30/188* (2012.01)
*B60K 17/04* (2006.01)
(Continued)

(52) U.S. Cl.
CPC ........... *B60W 30/188* (2013.01); *B60K 17/04* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 8,282,528 B2 * 10/2012 Jager ..................... B60W 10/06
477/32
8,428,844 B2 * 4/2013 Schaffeld ................ F02B 21/00
701/99

(Continued)

FOREIGN PATENT DOCUMENTS

DE    102015222551 A1    5/2017

OTHER PUBLICATIONS

Written Opinion of the EPO for EP17811939 A, free text portion. (Year: 2019).*

(Continued)

*Primary Examiner* — Dirk Wright
(74) *Attorney, Agent, or Firm* — Venable LLP; Jeffri A. Kaminski

(57) ABSTRACT

The invention relates to a method for controlling a turbocharger system (10) fluidly connected to an exhaust manifold (102) of a combustion engine (100) in a vehicle (800). The turbocharger system (10) comprises a turbocharger turbine (22) operable by exhaust gases from the exhaust manifold, and a tank (40) with pressurized gas. The tank is fluidly connectable to the turbocharger turbine. The method comprises the steps of: predicting the coming drive conditions of the vehicle, injecting pressurized gas from the tank to drive the turbocharger turbine such that the turbocharger turbine is at least partly driven by the pressurized gas, in response to the predicted drive conditions, and/or charging the tank with pressurized gas in response to the predicted drive conditions, wherein the predicted drive conditions are indicative of the need for injection of pressurized gas from the tank.

20 Claims, 4 Drawing Sheets

(51) Int. Cl.
*B60W 10/06* (2006.01)
*B60W 10/11* (2012.01)
*F02B 37/02* (2006.01)
*F02B 37/12* (2006.01)
*F02D 41/00* (2006.01)
*F02D 41/02* (2006.01)
*F02D 41/14* (2006.01)
*G01S 19/42* (2010.01)

(52) U.S. Cl.
CPC .............. *F02B 37/02* (2013.01); *F02B 37/12* (2013.01); *F02D 41/0007* (2013.01); *F02D 41/021* (2013.01); *F02D 41/1401* (2013.01); *G01S 19/42* (2013.01); *B60W 2510/0638* (2013.01); *B60W 2552/00* (2020.02); *B60W 2710/0638* (2013.01); *B60W 2710/1005* (2013.01); *F02D 2041/1412* (2013.01); *F02D 2200/101* (2013.01); *F02D 2200/701* (2013.01)

(56) References Cited

U.S. PATENT DOCUMENTS

| | | | | |
|---|---|---|---|---|
| 9,322,322 B2* | 4/2016 | Almkvist | ................ | F02B 29/02 |
| 9,719,438 B2* | 8/2017 | Almkvist | ................ | F02B 37/14 |
| 10,273,874 B2* | 4/2019 | Santillo | ................... | F02D 41/26 |
| 2010/0318268 A1* | 12/2010 | Jager | ........................ | F02B 37/04 |
| | | | | 701/54 |
| 2013/0305715 A1 | 11/2013 | Rollinger et al. | | |
| 2014/0261342 A1 | 9/2014 | Kolhouse et al. | | |
| 2015/0377157 A1 | 12/2015 | Almkvist et al. | | |
| 2017/0298811 A1 | 10/2017 | Santillo et al. | | |

OTHER PUBLICATIONS

International Search Report and Written Opinion dated Mar. 6, 2018 in corresponding International PCT Application No. PCT/EP2017/081865, 13 pages.

* cited by examiner

METHOD FOR CONTROLLING A TURBOCHARGER SYSTEM OF A COMBUSTION ENGINE IN A VEHICLE

CROSS-REFERENCE TO RELATED APPLICATIONS

This application is a U.S. National Stage application of PCT/EP2017/081865, filed Dec. 7, 2017, and published on Jun. 13, 2019, as WO 2019/110108 A1, all of which is hereby incorporated by reference in its entirety.

TECHNICAL FIELD

The invention relates to a method for controlling a turbocharger system fluidly connected to an exhaust manifold of a combustion engine in a vehicle. The invention further relates to a computer program, a computer readable medium carrying a computer program, and to a control unit configured to perform the steps of the method for controlling a turbocharger system. The invention further relates to a turbocharger system, and to a vehicle comprising such turbocharger system or such control unit.

The invention is applicable on vehicles, in particularly low, medium and heavy duty vehicles commonly referred to as trucks. Although the invention will mainly be described in relation to a truck, it may also be applicable for other type of vehicles.

BACKGROUND

A turbocharger, or a turbo, is a turbine-driven forced induction device that increases the efficiency and power output of a combustion engine, by forcing extra gas into the combustion engine. The turbocharger typically comprises a turbocharger turbine and a turbocharger compressor, the latter being driven by the turbocharger turbine. The improvement for a turbo-equipped combustion engine compared to a combustion engine operating without a turbo is that the turbocharger compressor can deliver more air/gas, into the cylinders of the combustion engine. Consequently, more fuel can be burnt.

In U.S. Pat. No. 9,322,322 a turbocharger system comprising a tank for compressed gas and an exhaust manifold conduit in fluid communication with an inlet of the turbocharger. The tank is in fluid communication with the manifold conduit and is arranged to push compressed gas into the manifold conduit during a predetermined pulse duration time period for initial compressor spin up in the turbocharger. However, after usage of the pressurized gas, recharge time of the tank is needed for full effect. In situations where a relatively high amount of pressurized gas is desired, the time for recharging the tank may be a limiting factor.

Thus, there is still a need in the industry for further improvements relating to the management of pressurized gas for driving said turbocharger.

SUMMARY

In view of the above-mentioned and other drawbacks of the prior art, the object of the present inventive concept is to provide an improved method of controlling a turbocharger system fluidly connected to an exhaust manifold of a combustion engine in a vehicle, and more specifically, to improve the accessibility of compressed air in situations where a relatively high amount of pressurized gas is desired. The object is achieved by a method according to claim 1.

According to a first aspect of the invention, a method for controlling a turbocharger system fluidly connected to an exhaust manifold of a combustion engine in vehicle is provided. The turbocharger system comprises a turbocharger turbine operable by exhaust gases from said exhaust manifold, and a tank with pressurized gas, said tank being fluidly connectable to said turbocharger turbine. The method comprises the steps of:

predicting the coming drive conditions of the vehicle,
injecting pressurized gas from said tank to drive said turbocharger turbine such that the turbocharger turbine is at least partly driven by said pressurized gas, in response to the predicted drive conditions, and/or
charging said tank with pressurized gas in response to the predicted drive conditions, wherein the predicted drive conditions are indicative of the need for injection of pressurized gas from said tank.

By the provision of a method which comprises the step of injecting pressurized gas from said tank, and/or charging the tank with pressurized gas, in response to the predicted drive conditions, the accessibility of pressurized gas in said tank can be adapted based on the near future drive conditions. Hereby, the torque response can be improved when the drive conditions challenge the operation of the combustion engine. Moreover, by charging the tank with pressurized gas in response to the predicted drive conditions, the torque response can be improved over a longer period of time, as the accessible pressurized gas in the tank can be increased in response to, or to correspond to, the predicted drive conditions. It should be noted that when stating that the predicted drive conditions are indicative of the need for injection of pressurized gas from said tank in the step of charging said tank with pressurized gas in response to the predicted drive conditions, the predicted drive conditions may be indicative of the need for either present or coming (e.g. near future) injection of pressurized gas from said tank.

It should be noted that the step of injecting pressurized gas from said tank to drive said turbocharger turbine, should be interpreted as that the pressurized gas from said tank is used to drive, or at least contribute in driving, the turbocharger turbine. Hence the turbocharger turbine may additionally to the pressurized gas from said tank, be driven by exhaust gases from said exhaust manifold.

According to at least one example embodiment, the predicted drive conditions are, or comprises, predicted road conditions, such as e.g. road types, road speed limits, road topography (e.g. descent or ascent of the road), turns, intersections, etc. Thus, the method enables injection of pressurized gas from said tank and/or charging of the tank with pressurized gas to be carried out based on at least the predicted road conditions. Hence, a relatively readily accessible information, which at least partly is independent of the vehicle itself, can be used to decide when injection of pressurized gas from said tank and/or charging of the tank with pressurized gas should be carried out (e.g. to satisfy a demand of improvement in torque response). Additionally or alternatively, the predicted drive conditions are, or comprise, predicted vehicle operational conditions, or vehicle operational modes, such as e.g. start-up, acceleration from standstill, engine braking etc. Hereby, information being related to vehicle dependent operations can be used to decide when injection of pressurized gas from said tank and/or charging of the tank with pressurized gas should be carried out, e.g. by using vehicle driving schedules, or anticipated vehicle operations, or logical consequence of certain vehicle events.

According to at least one example embodiment, at least the position of the vehicle, and/or a vehicle movement parameter such as e.g. the speed of the vehicle, and/or the direction of travel of the vehicle, and/or the acceleration or deceleration of the vehicle, can be used in the prediction of the coming drive conditions. Hereby the time, or occurrence, of a certain predicted drive condition may be determined.

Thus, the predicted drive conditions may be indicative of the pressurized gas needed to be injected from said tank in order to compensate for any additional challenge imposed on the combustion engine during said predicted drive conditions. For example, required or desired combustion engine parameters, or required or desired combustion engine output (e.g. load, or torque or torque response) may be determined in relation to the predicted drive conditions, and thus the injection of pressurized gas from the tank to drive the turbocharger turbine, or charging of the tank with pressurized gas, may be controlled to respond, e.g. be controlled to assist if needed, to such required or desired combustion engine parameters, or required or desired combustion engine output. In other words, the expected load on, or required torque from, the combustion engine during the predictive drive conditions, may be determined and compensated for by charging the tank with pressurized gas and/or injection of pressurized gas from said tank. It should be noted that the predicted drive conditions are a result from the step of predicting the coming, or future, or near future, drive conditions of the vehicle.

It should be understood that the charging of the tank with pressurized gas in response to the predicted drive conditions, may include adapting the charging of the tank during a predicted drive condition in which injection of pressurized gas from said tank is not needed. Thus, suitable timing of charging the tank may be achieved. For example, the predicted drive conditions may include a descent or downhill, for which injection of pressurized gas from the tank is not needed, and such information may be used to schedule charging of the tank during the descent or downhill.

According to at least one example embodiment, the predicted drive conditions may be used to deactivate injection of pressurized gas from said tank and/or charging of the tank with pressurized gas. In other words, the method comprises the step of deactivating injection functionality of pressurized gas from said tank based on the predicted drive conditions and/or deactivating charging functionality of said tank with pressurized gas in response to the predicted drive conditions. Hereby, the use of pressurized gas can be reduced in response to the predicted drive conditions, and at least the parts of the turbocharger system related to the injection of pressurized gas from said tank can be used less frequent, and can thus be kept functional for a longer period.

According to at least one example embodiment, said tank is charged with pressurized gas using a compressor or exhaust gas from said combustion engine. Hereby, suitable means for charging the tank with pressurized gas are provided.

For embodiments in which a compressor is used to charge said tank with pressurized gas, said turbocharger system typically comprises a compressor for supplying pressurized gas to said tank, and the method comprises the step of charging the tank with pressurized gas using said compressor, in response to the predicted drive conditions. Hereby, a simple but yet effective way of charging the tank is provided. The compressor may be used to repeatedly charge or recharge the tank, in response to the predicted drive conditions. The compressor may for example be a mechanically driven compressor, e.g. a mechanically driven air compressor, driven by the combustion engine. Alternatively, the compressor may be an electrically driven compressor using ambient air, and/or recirculating gas from the turbocharger compressor. According to at least one example embodiment, the compressor may be formed by the combustion engine, such as e.g. one of the cylinders. Thus, said cylinder may be used to compress air/gas which is used to charge the tank.

For embodiments in which exhaust gas from said combustion engine is used to charge said tank with pressurized gas, said turbocharger system typically comprises an inlet pressure pipe for supplying pressurized gas to said tank, and the method comprises the step of charging the tank with pressurized gas via said inlet pressure pipe. Hereby, a relatively cost efficient way of charging the tank is provided, as no separate compression of the gas is necessary. However, the gas pressure in the tank is limited to the present gas pressure of the exhaust gas from the combustion engine turbocharger turbine. Thus, the tank may be used to store pressurized gas (e.g. during blowdown peaks), which later (when the exhaust gas pressure is lower compared to the blowdown peaks) can be injected from said tank to drive said turbocharger turbine.

According to one alternative example embodiment, the tank is charged or recharged by using outlet gas from the turbocharger turbine (so called boost air/gas, or air/gas at boost pressure). Corresponding to embodiments where the tank is charged with exhaust gas from the combustion engine, no separate compression of the gas is necessary, however, the gas pressure in the tank is limited to the present gas pressure of the outlet gas from the turbocharger turbine. Thus, the tank may be used to store boost air/gas for a later use.

According to at least one example embodiment, said step of charging the tank with pressurized gas comprises charging the tank to at least the nominal working pressure of the tank. Hereby, pressurized gas corresponding to the nominal working pressure of the tank is available or accessible for injection to drive said turbocharger turbine. By repeatedly charging the tank with pressurized gas to the nominal working pressure, in response to the predicted drive conditions, the turbocharger turbine may be at least partly driven (i.e. boosted) by the pressurized gas from said tank repeatedly when needed.

The nominal working pressure of the tank may be referred to as a "full tank", or a "tank at full pressure".

According to at least one example embodiment, said step of charging the tank with pressurized gas comprises charging the tank with an excess pressure compared to a nominal working pressure of the tank. Hereby, more pressurized gas can be made accessible in said tank. Thus, if the predicted drive conditions indicate that more pressurized gas than what is accessible at the nominal working pressure of the tank (or that pressurized gas at a higher pressure compared to what is present at the nominal working pressure of the tank) is needed in order to compensate for the additional challenge imposed on the combustion engine during said predicted drive conditions, the charging of the tank may be adapted to respond to such indication, and charge the tank with an excess pressure. Typically, pressurizing the tank above the nominal working pressure is undesired as it is related to relatively high energy consumption. However, the inventor has realized that an excess pressure of the gas in said tank can be motivated when adapting the use of pressurized gas to the predicted drive conditions. In other words, the energy used to pressurize the tank above its nominal working pressure, can be motivated by the advantageous of having more pressurized gas accessible in said tank, when the pressurized gas is used in response to the predicted drive conditions.

According to at least one example embodiment, said step of charging the tank with pressurized gas is carried out prior to the step of injecting pressurized gas from said tank to drive said turbocharger turbine. Hereby, pressurized gas in said tank will be accessible for injection to drive the turbocharger turbine. For example, by providing a tank which has been charged with pressurized gas, for example to an excess pressure compared to the nominal working pressure of the tank, predicted drive conditions imposing an increased need of turbocharger turbine pressure is readily at hand.

According to at least one example embodiment, said step of predicting the coming drive conditions of the vehicle comprises using information from a global positioning system, a dead reckoning system and/or a topographical data map. Hereby, relatively readily accessible information may be used to predict the coming drive conditions, such as e.g. the coming road conditions. For example, by using the global positioning system, the position of the vehicle is known, which together with the speed of the vehicle and/or the direction of travel of the vehicle, and/or the acceleration of the vehicle, can be used to predict the coming position, or future position, or near future position, of the vehicle. Such information together with a topographical data map can be used to determine the predicted drive conditions, e.g. if a descent or ascent of the road is a head. Thus, the load, or torque, or torque response, which the combustion engine is required to respond to during such predicted drive conditions can be determined, and the injecting of pressurized gas from said tank and/or charging of said tank with pressurized gas, can be carried out accordingly. Thus, pressurized gas from said tank may be used to improve the output or operation of the combustion engine and e.g. improve the torque response compared to a situation where no pressurized gas is injected from said tank According to at least one example embodiment, said vehicle further comprises a gear box or transmission system coupled to the combustion engine, wherein said method comprises the step of:
executing a first gear shifting operation, and subsequently executing a second gear shifting operation, and
wherein a step of injecting pressurized gas from said tank to drive said turbocharger turbine is carried out between the step of executing a first gear shifting operation and the step of executing a second gear shifting operation.

Hereby, a suitable timing of using pressurized gas from said tank to drive the turbocharger turbine is provided. For example, by timing the injection of pressurized gas to gear shifting operations, the torque response may be improved when greatly needed. According to at least one example embodiment, the gear shifting operations, and the injection of pressurized gas from said tank, is repeatedly and alternately carried out, e.g. in response to an ascent of the road.

According to at least one example embodiment, said step of injecting pressurized gas from said tank is at least partly dependent of an engine speed increasing action of the combustion engine and/or a gear shifting operation. Hereby, the timing of the injection of pressurized gas may be based, at least partly, on an engine speed increasing action and/or a gear shifting operation (the gear shifting operation being exemplified above). For example, by at least partly basing the timing of the injection of pressurized gas on engine speed increasing action, the injection of pressurized gas can be adapted to the desire of accelerating the vehicle and/or preventing deceleration of the vehicle. The engine speed increasing action may initiate an increased fuel injection to the combustion engine. For a vehicle application in which a driver drives the vehicle, the engine speed increasing action is typically initiated by a movement of the vehicle's accelerator pedal.

According to one embodiment, the method comprises the step of initiating or increasing fuel injection to the combustion engine before, simultaneously with, or after said step of injecting pressurized gas from said tank to drive said turbocharger turbine. It should be understood that initiating or increasing fuel injection to the combustion engine should be interpreted as the act of injecting fuel. Thus, the combination of injection of pressurized gas and the injection, or increase of injection, of fuel may increase the combustion engine's efficiency and/or power output.

According to one embodiment, the method comprises the step of:
initiating or increasing fuel injection to the combustion engine after said step of predicting the coming drive conditions of the vehicle, and prior to said step of injecting pressurized gas from said tank to drive said turbocharger turbine. Such timing of the injection or increasing of fuel is suitable for at least partly driving said turbocharger turbine.

According to at least one example embodiment, said turbocharger system further comprises a valve for controlling the release of pressurized gas from said tank, and the method further comprises the step of operating the valve to release pressurized gas needed for driving the turbocharger turbine in response to the predicted drive conditions. Hereby, a simple but yet effective way to control the release of pressurized gas from said tank is provided. The tank may e.g. be operated by an actuator, such as e.g. an electronic actuator, which is operated by a control unit. Moreover, the valve may control the release of pressurized gas from the tank to various locations before, to, and after the combustion engine, typically via a valve pipe fluidly connected to the valve and the respective various locations.

It should be understood that when stating that the tank is fluidly connectable to said turbocharger turbine, fluid in the tank may, in at least some operational modes, flow from the tank to the turbocharger turbine. For example, in operational modes in which the valve is opened (i.e. the valve allows fluid to pass), the tank may be in fluid connection with the turbocharger system, e.g. via a valve pipe connected to the exhaust manifold or the exhaust manifold pipe. Correspondingly, in operational modes in which the valve is closed (i.e. the valve prevents fluid to pass), no fluid is allowed to fluid from the tank to the turbocharger turbine. In other words, a fluid distribution system is typically arranged between the tank and the turbocharger system. The distribution system may comprise at least one pipe or conduit, and/or at least one valve, and/or at least some part or portion of the combustion engine.

The turbocharger system may further comprise a turbocharger compressor driven by said turbocharger turbine, and said combustion engine may comprise an inlet manifold fluidly connected to said turbocharger compressor, wherein said method comprises the step of operating said valve to release pressured gas from said tank to the exhaust manifold of the combustion engine, to an exhaust manifold pipe arranged between the exhaust manifold and the turbocharger turbine, to the turbocharger turbine casing, to the inlet manifold of the combustion engine, to the turbocharger compressor casing, or to an inlet manifold pipe arranged between the inlet manifold and the turbocharger compressor. Hence, the valve pipe may be arranged between the valve and the exhaust manifold, the exhaust manifold pipe, the turbocharger turbine casing, the inlet manifold, the turbocharger compressor casing, or to the inlet manifold pipe. In other words, the valve may be fluidly connectable to (e.g. via the valve pipe) the exhaust manifold, the exhaust manifold pipe, the turbocharger turbine casing, the inlet manifold, the turbocharger compressor casing, or to the inlet manifold pipe.

Hereby, various options for injecting pressurized gas to drive the turbocharger turbine is provided.

In embodiments where the pressurized gas from said tank is injected upstream of the exhaust manifold of said combustion engine, i.e. to the inlet manifold of said combustion engine, to the inlet manifold pipe or to the turbocharger compressor casing, the injected pressurized gas will increase the fluid pressure and allow for an increased fuel injection and/or an increase amount of burnt fuel in the combustion engine, which will result in an increased energy in the combustion engine, and hence an increased pressure in the exhaust manifold and further to the turbocharger turbine. In other words, the injection of pressurized gas upstream of the exhaust manifold, results in an increased work of the turbocharger turbine. Thus, the pressurized gas is injected from said tank to drive said turbocharger turbine.

According to one embodiment, the valve is operated in such a way that the pressurized gas is released from said tank during at least 1 second, such as e.g. between 1 second and 5 seconds.

Such operational time of the valve is suitable for at least partly driving said turbocharger turbine with pressurized gas from said tank.

According to at least a second aspect of the present invention, the object is achieved by a control unit according to claim 10. The control unit is configured to perform the steps of the method described in accordance with the first aspect of the invention.

Effects and features of this second aspect of the present invention are largely analogous to those described above in connection with the first aspect of the inventive concept, respectively. Embodiments mentioned in relation to the first aspect of the present invention are largely compatible with the second aspect of the invention.

According to at least a third aspect of the invention, the object is achieved by a turbocharger system according to claim 11. More specifically, the invention relates to a turbocharger system for use together with a combustion engine in a vehicle, said combustion engine having an exhaust manifold, said turbocharger system comprising:
a turbocharger turbine operable by exhaust gases from said exhaust manifold,
a tank comprising pressurized gas, said tank being fluidly connectable to said turbocharger turbine, and
a control unit
wherein the control unit is configured to:
predict and/or receive data indicative of the coming drive conditions of the vehicle, initiate injection of pressurized gas from said tank to drive said turbocharger turbine such that the turbocharger turbine is at least partly driven by said pressurized gas, in response to the predicted drive conditions, and/or
initiate charging of the tank with pressurized gas in response to the predicted drive conditions, wherein the predicted drive conditions are indicative of the need for injection of pressurized gas from said tank.

Effects and features of this third aspect of the present invention are largely analogous to those described above in connection with the first aspect of the inventive concept. Embodiments mentioned in relation to the first aspect of the present invention are largely compatible with the third aspect of the invention, of which some embodiments are explicitly mentioned in the following. In other words, a method for controlling a turbocharger system as described with any of the embodiments of the first aspect of the invention is applicable to, or may make use of, the turbocharger system described in relation to the third aspect of the invention.

The turbocharger system may further comprise a turbocharger compressor driven by the turbocharger turbine to compress intake air to said combustion engine. Hence the turbocharger system comprises a turbocharger comprising the turbocharger turbine and the turbocharger compressor mechanically coupled to the turbocharger turbine by a turbine shaft. The turbocharger turbine is driven by exhaust gases from said combustion engine, and/or by pressurized air from said tank, and the turbocharger compressor is driven by the turbocharger turbine via said turbine shaft.

The combustion engine typically comprises an inlet manifold fluidly connected to said turbocharger compressor, for supplying fuel and/or air and/or a fuel-air mixture to the combustion engine. The inlet manifold is typically fluidly connected to the turbocharger compressor via an inlet manifold pipe arranged between the inlet manifold and the turbocharger compressor. Correspondingly, the exhaust manifold is typically fluidly connected to the turbocharger turbine via an exhaust manifold pipe arranged between the exhaust manifold and the turbocharger turbine. Moreover, the exhaust after treatment system is fluidly connected to the combustion engine and the exhaust manifold, and is typically arranged downstream of said turbocharger turbine.

For example, and according to one embodiment, the turbocharger system further comprises a compressor for supplying pressurized gas to said tank, wherein said control unit is configured to initiate charging of said tank with pressurized gas using said compressor. Additionally or alternatively, the turbocharger system comprises an inlet pressure pipe and an inlet pressure pipe valve configured control supply of pressurized gas to said tank via said inlet pressure pipe, wherein said control unit is configured to initiate charging of said tank with pressurized gas by opening or closing said inlet pressure pipe valve.

By using a compressor, a simple but yet effective way of charging the tank is provided, and by charging the tank with exhaust gas, a relatively cost efficient way of charging the tank is provided, as no separate compression of the gas is necessary. Other effects and features of these embodiments are analogous to the corresponding embodiments of the first aspect of the present invention and are not repeated again here. According to at least one example embodiment, the compressor may be formed by the combustion engine, such as e.g. one of the cylinders. Thus, said cylinder may be used to compress air/gas which is used to charge the tank.

According to at least one example embodiment, said control unit is configured to terminate charging of said tank when said tank is charged to its nominal working pressure, or said control unit is configured to terminate charging of said tank when said tank is charged to an excess pressure compared to the nominal working pressure of the tank. Hereby, the control unit may be configured to both initiate charging of said tank, and terminate charging of said tank. Thus, a simple but yet effective way of charging the tank is provided, using said control unit.

For example, and according to at least one example embodiment, said control unit is configured to initiate charging of the tank prior to initiating injecting of pressurized gas from said tank to drive said turbocharger turbine. Effects and features of this embodiment is analogous to the corresponding embodiment of the first aspect of the present invention and are not repeated again here. However, the control unit may also be configured to terminate charging of said tank prior to initiating injecting of pressurized gas from said tank to drive said turbocharger turbine. Naturally, the control unit may be configured to terminate injection of pressurized gas from said tank.

For example, and according to at least one example embodiment, said control unit is configured to predict the coming drive conditions of the vehicle by using information from a global positioning system, a dead reckoning system and/or a topographical data map. Effects and features of this embodiment is analogous to the corresponding embodiment of the first aspect of the present invention and are not repeated again here. According to an alternative embodiment, said control unit may receive data being indicative of the coming drive conditions, e.g. by receiving such data from a server distant to said vehicle.

For example, and according to at least one example embodiment, said vehicle further comprises a gear box or transmission system coupled to the combustion engine, wherein said control unit is configured to:
identify a first gear shifting operation, and subsequently identify a second gear shifting operation, and
initiate injection of pressurized gas from said tank to drive said turbocharger turbine such that the turbocharger turbine is at least partly driven by said pressurized gas between the identification of the first gear shifting operation and the second gear shifting operation.

Effects and features of this embodiment are analogous to the corresponding embodiment of the first aspect of the present invention and are not repeated again here.

For example, and according to at least one example embodiment, said turbocharger system further comprises a valve for controlling the release of pressurized gas from said tank to the turbocharger turbine, wherein said control unit is configured to control the operation of the valve to release pressurized gas needed for at least partly drive said turbocharger turbine. Effects and features of this embodiment are analogous to the corresponding embodiment of the first aspect of the present invention and are not repeated again here.

For example, and according to at least one example embodiment, said valve controls the release of pressurized gas from said tank to the exhaust manifold of the combustion engine, to the exhaust manifold pipe arranged between the exhaust manifold and the turbocharger turbine, to the turbocharger turbine casing, to the inlet manifold of the combustion engine, to the turbocharger compressor casing, or to the inlet manifold pipe arranged between the inlet manifold and the turbocharger compressor. Effects and features of this embodiment are analogous to the corresponding embodiment of the first aspect of the present invention and are not repeated again here.

According to at least a fourth aspect of the invention, the object is achieved by a vehicle according to claim 18. More specifically, the invention relates to a vehicle comprising a turbocharger system in accordance with the third aspect of the invention, or a control unit in accordance with the second aspect of the invention.

Thus, the vehicle may comprise the combustion engine and the turbocharger system. Thus, the vehicle may comprise the control unit being configured according to any embodiment described with the second aspect of the invention.

According to one embodiment, the combustion engine is an internal combustion engine such as e.g. a diesel driven internal combustion engine.

According to at least a fifth aspect of the present invention, the object is achieved by a computer program according to claim 19, the computer program comprising program code means for performing the steps of the first aspect of the invention, when said program is run on a computer. The computer may e.g. be comprised in, or be comprised of, the control unit of the second aspect of the invention.

Effects and features of this fifth aspect of the present invention are largely analogous to those described above in connection with the first aspect of the invention. Embodiments mentioned in relation to the first aspect of the present invention are largely compatible with the fifth aspect of the invention.

According to at least a sixth aspect of the present invention, the object is achieved by a computer readable medium according to claim 20, the computer readable medium carrying a computer program comprising program code means for performing the steps of the first aspect of the invention, when said program product is run on a computer. The computer readable medium may e.g. be comprised in the control unit of the second aspect of the invention.

Effects and features of this sixth aspect of the present invention are largely analogous to those described above in connection with the first aspect of the invention. Embodiments mentioned in relation to the first aspect of the present invention are largely compatible with the sixth aspect of the invention.

According to a further aspect of the invention, the object is achieved by a combustion engine system comprising a combustion engine having an exhaust manifold and a turbocharger system in accordance with the third aspect of the invention of the invention. The combustion engine system may further comprise an exhaust after treatment system. Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
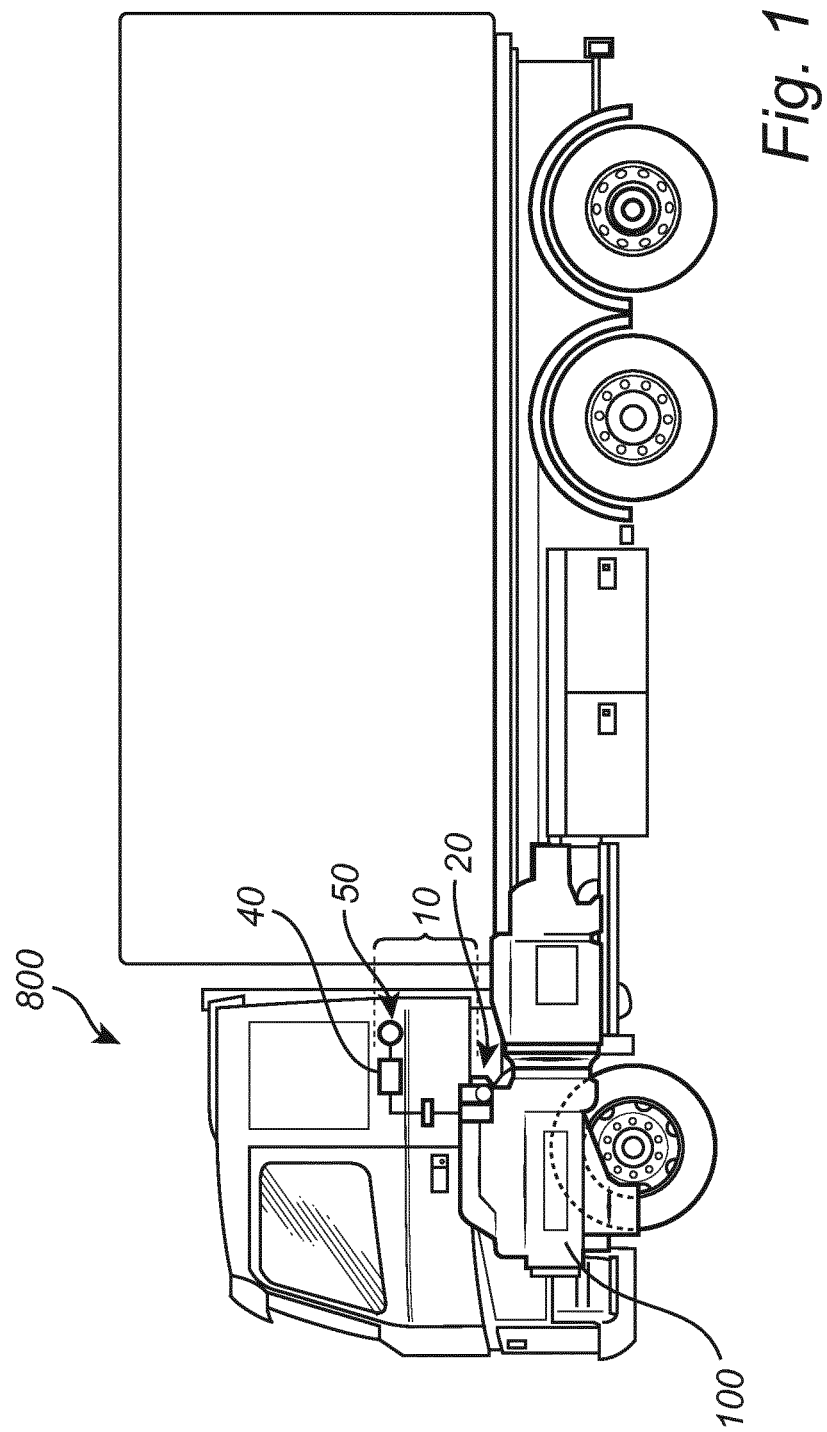
FIG. 1 is a side view of a vehicle comprising a combustion engine and a turbocharger system, in accordance with one example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

Figure 4:
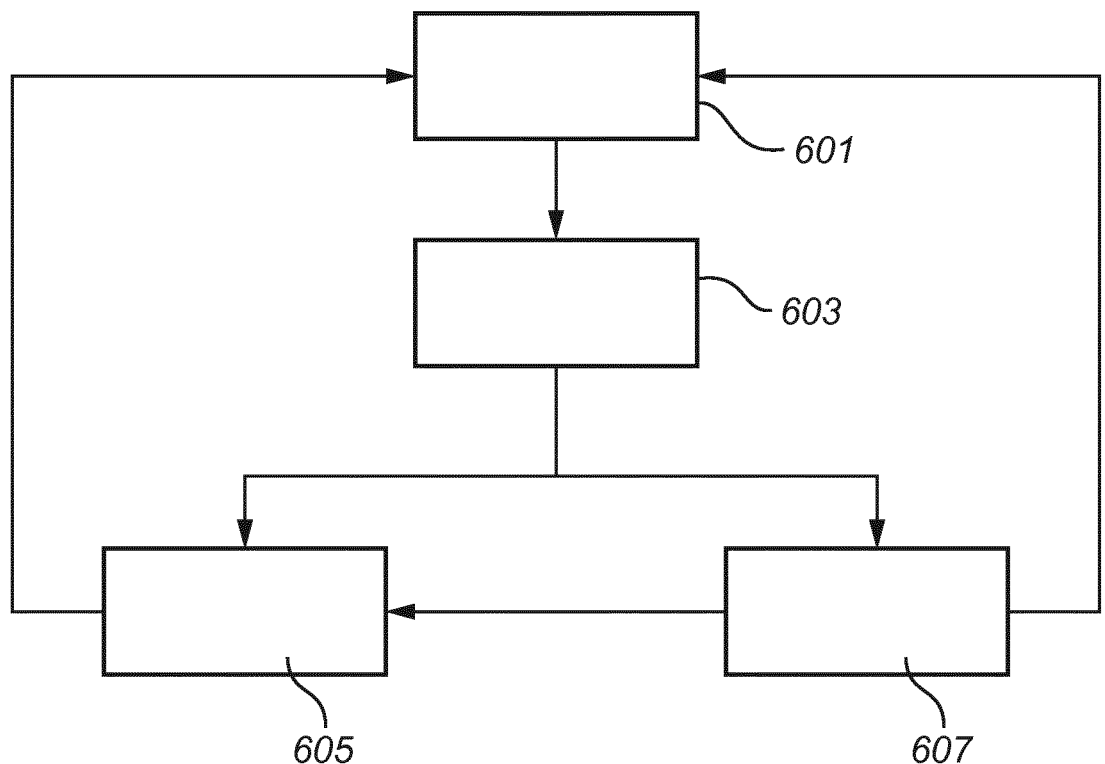
FIG. 4 is a flow chart describing the steps of a method for controlling a turbocharger system in accordance with some example embodiments of the invention.

With particular reference to FIG. 1, there is provided a vehicle 800 with a combustion engine 100, such as an internal combustion engine 100, and a turbocharger system 10 comprising a turbocharger 20, a tank with pressurized air 40 and a control unit 50, such as e.g. an ECU 50, according to the present invention (further described below with reference to FIG. 4). The vehicle 800 depicted in FIG. 1 is a truck 800 for which the inventive concept which will be described in detail below, is particularly suitable for.

Figure 2:
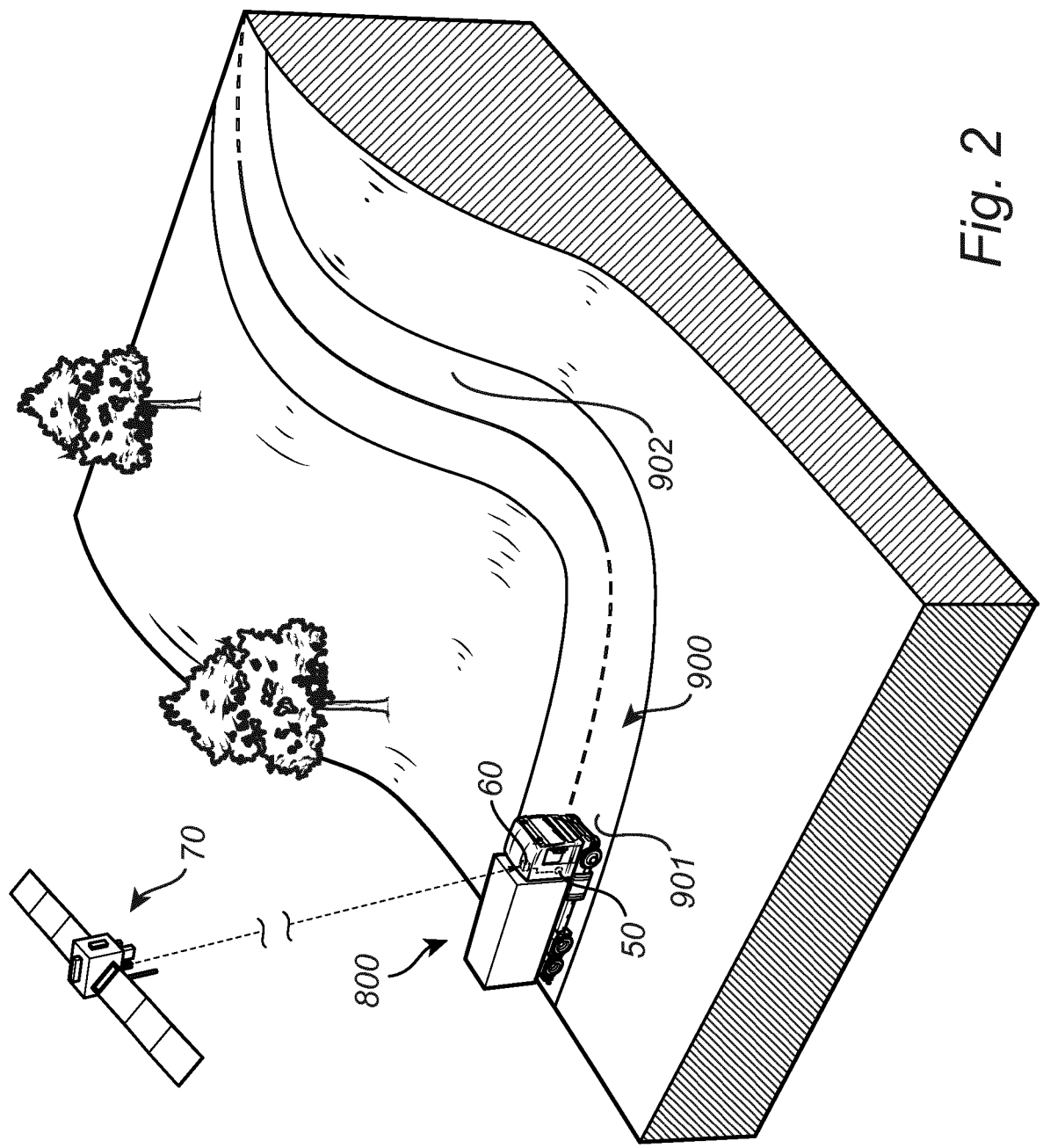
FIG. 2 is a perspective view of the vehicle of FIG. 1, travelling on a road, in accordance with one example embodiment of the present invention.

In FIG. 2, the vehicle 800 in FIG. 1 travels on a road 900 with varying road conditions, and is presently travelling on a flat part of the road 901. Hence, the drive conditions of the current position of the vehicle 800 are at least partly defined by the current road conditions, such as e.g. the inclination of the road 900 compared to an horizontal axis, i.e. at the vehicles' current position that the road 900 is flat, i.e. is horizontally arranged, the road surface characteristic, the road material, turns or bends of the road 900, etc. Furthermore, other conditions, such as e.g. vehicle operational conditions, may be comprised in the current drive conditions of the vehicle 800. The vehicle 800 in FIG. 2 typically travels along the road 900 in a certain direction, and at a certain instantaneous speed, and possibly with a certain acceleration or deceleration. Moreover, the vehicle 800 further comprises a global positioning system module 60, or GPS module, configured to determine the position of the vehicle 800 together with a global positioning system 70. The GPS module 60 is typically connected to the control unit 50.

As seen in FIG. 2, in the direction of travel of the vehicle 800, the flat part of the road 901 passes into an ascent, or an uphill part of the road 902. In other words, the drive conditions of the vehicle 800 will change compared to its current position, as at least the road conditions change by that the inclination of the road 900 compared to a horizontal axis changes. Thus, the vehicle 800 in FIG. 1 is about to drive into a part of the road 902 (i.e. the ascent) which will impose a greater challenge to the combustion engine 100 (i.e. a higher power output of the combustion engine 100 will be needed in order to maintain the speed of the vehicle 800), compared to the flat part of the road 901. Hence, for the vehicle 800 in FIG. 2, based on the current position of the vehicle 800, e.g. determined by the GPS module 60, and knowledge of the coming road conditions, e.g. by a topographical data map, the predicted drive conditions of the vehicle 800 can be determined.

Figure 3:
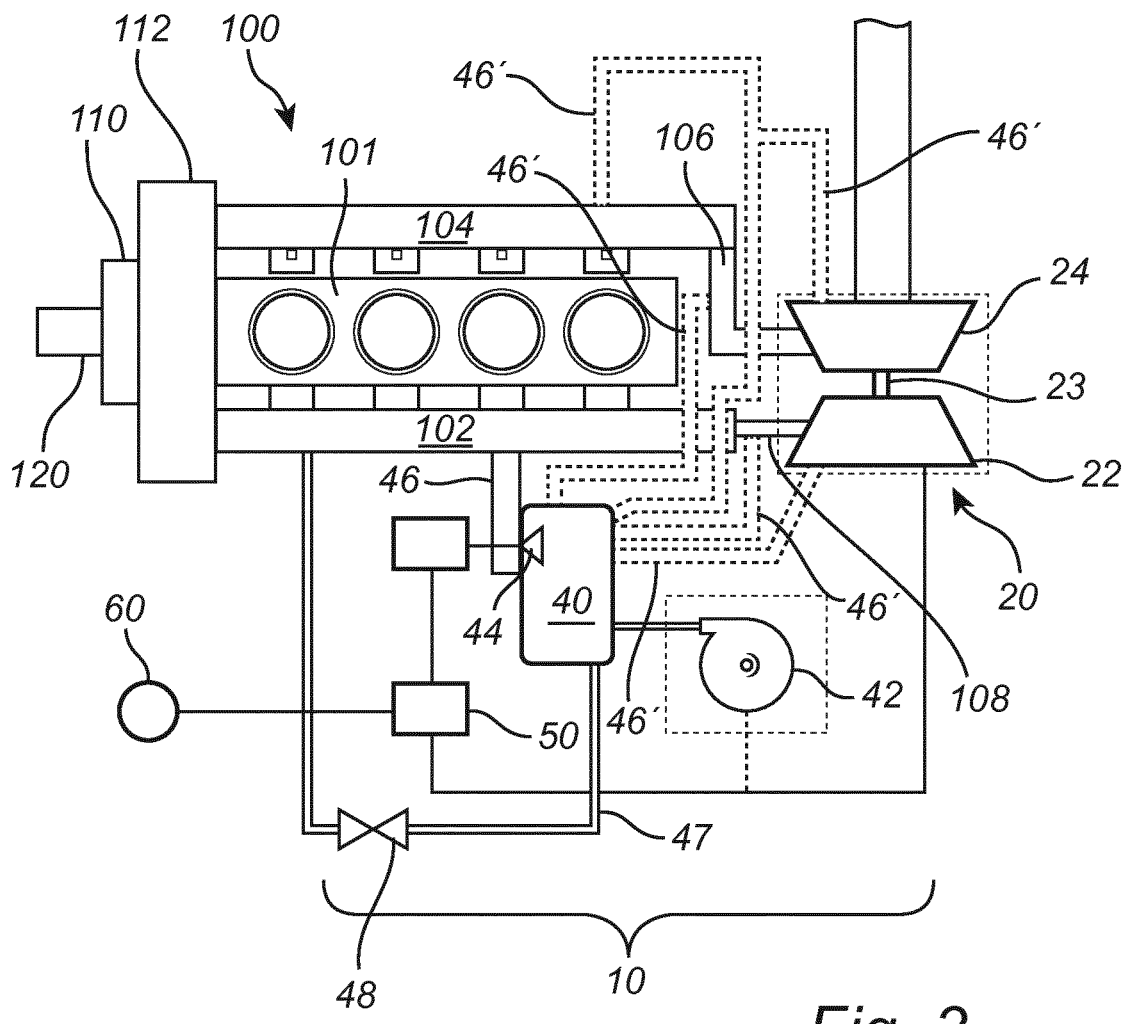
FIG. 3 shows a schematic overview of the combustion engine and the turbocharger system of FIG. 1, in accordance with one example embodiment of the present invention.

FIG. 3 shows a schematic overview of at least parts of a combustion engine 100 and a turbocharger system 10. In the non-limiting example of FIG. 3, the combustion engine 100 comprises an engine block 101 in a four-cylinder, four-stroke, diesel engine with a gear box 110 and a clutch 112 that is connected to an engine crankshaft 120. The combustion engine 100 of FIG. 3 comprises an inlet manifold 104 fluidly connected to an intake port (not shown) of the combustion engine 100, for supplying fuel and/or air and/or a fuel-air mixture to the combustion engine 100. Correspondingly, the combustion engine 100 comprises an exhaust manifold 102 which typically is fluidly connected to an exhaust after treatment system (not shown) of the combustion engine 100.

In the example of FIG. 3, the combustion engine 100 is overloaded by means of the turbocharger system 10. More specifically, the turbocharger system 10 comprises a turbocharger 20 having a turbocharger turbine 22 and a turbocharger compressor 24 of known type coupled to the turbocharger turbine 22 by a turbine shaft 23. The turbocharger turbine 22 is operable by exhaust gases from the exhaust manifold 102, and thus drives the turbocharger compressor 24 via the turbine shaft 23. The turbocharger compressor 24 is fluidly connected to the inlet manifold 104 via an inlet manifold pipe 106, and is configured for compressing intake air to the combustion engine 100. Optionally, an intercooler (not shown) may be arranged in fluid contact between the turbocharger compressor 24 and the inlet manifold 104. Correspondingly, the turbocharger turbine 22 is fluidly connected to the exhaust manifold 102 via an exhaust manifold pipe 108, and is configured for driving the turbocharger compressor 24 via the turbine shaft 23. In other words, the exhaust manifold pipe 108 is fluidly connected between the exhaust manifold 102 of the combustion engine 100 and the turbocharger turbine 22. The turbocharger turbine 22 is fluidly connected in between the exhaust manifold 102 of the combustion engine 100.

As shown in FIG. 3, the turbocharger system 10 further comprises a tank 40 with pressurized gas, a compressor 42 for supplying pressurized gas to the tank 40, and a valve 44 for controlling the release of pressurized gas from the tank 40. The turbocharger system 10 in FIG. 3 further comprises a control unit 50 connected to the valve 44 and the compressor 42. In FIG. 3, the valve 44 may control the release of pressurized gas from the tank 40 to various locations before, to, and after the combustion engine 100, typically via a valve pipe 46 fluidly connected to the valve 44 and the respective various locations. In FIG. 3, the valve pipe 46 is arranged to provide the pressurized gas from the tank 40 to the exhaust manifold 102, but as indicated with dashed valve pipes 46', the pressurized gas from the tank 40 may alternatively be injected to the exhaust manifold pipe 108, the turbocharger turbine 22 casing, the inlet manifold 104, the turbocharger compressor 24 casing, or the inlet manifold pipe 106.

The operation of the turbocharger system 10, and the function of the control unit 50 will now be described in more detail. The control unit 50 is configured to:
predict and/or receive data indicative of the coming drive conditions of the vehicle 800, initiate injection of pressurized gas from the tank 40 to drive the turbocharger turbine 22 such that the turbocharger turbine 22 is at least partly driven by the pressurized gas, in response to the predicted drive conditions, and/or
initiate charging of the tank 40 with pressurized gas in response to the predicted drive conditions, wherein the predicted drive conditions are indicative of the need for injection of pressurized gas from the tank (40).

Hereby, the accessibility of pressurized gas in the tank 40 can be adapted based on the near future drive conditions, such as e.g. based on coming drive conditions as described with reference to FIG. 2. Hereby, the torque response can be improved when the drive conditions challenge the operation of the combustion engine 100. Moreover, by charging the tank 40 with pressurized gas in response to the predicted drive conditions, the torque response can be improved over a longer period of time, as the accessible pressurized gas in the tank 40 can be increased to correspond to the predicted drive conditions. As described with reference to FIG. 2, the vehicle 800 comprise a GPS module 60, and the control unit 50 may thus be configured to predict and/or receive data indicative of the coming drive conditions of the vehicle 800 by using the GPS module 60 and information from a global positioning system 70. Additionally or alternatively, the control unit 50 is configured to predict and/or receive data indicative of the coming drive conditions of the vehicle 800 by using information from a dead reckoning system and/or a topographical data map, and/or any vehicle movement parameter, such as e.g. vehicle speed, direction of travel of the vehicle 800, acceleration or deceleration of the vehicle 800, etc.

Figure 5:
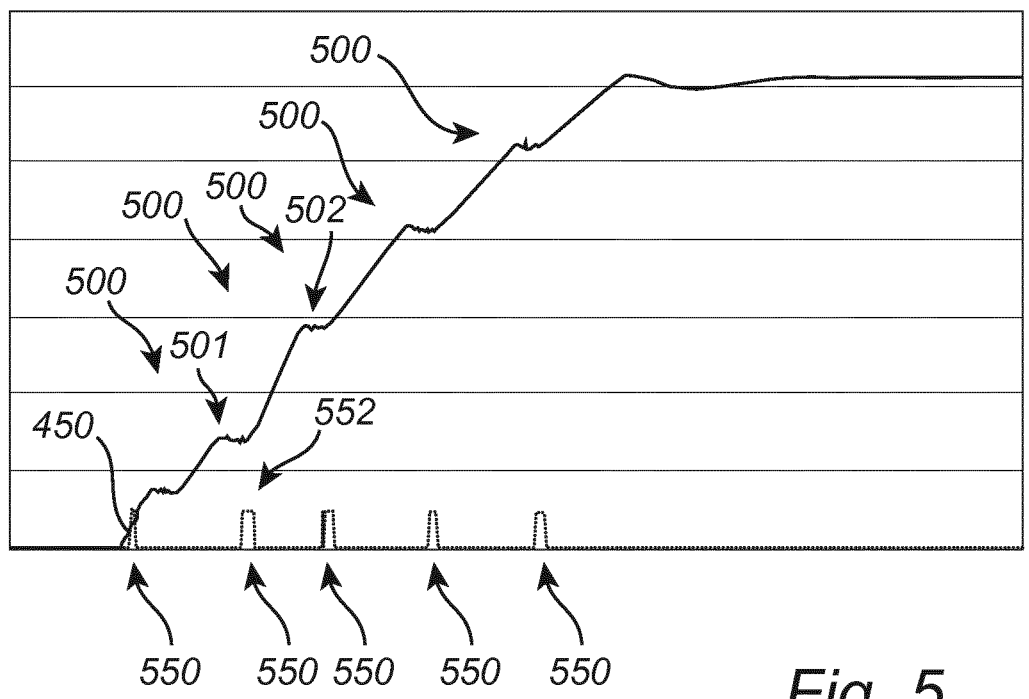
FIG. 5 is a graph showing the result of repeatable injections of pressurized gas during several gear shift operations, in accordance with some example embodiments of the invention.

As shown in FIG. 3, the combustion engine 100 is coupled to a gear box 110. Thus, during driving of the vehicle 800, different gears may be used. FIG. 5 shows a graph comprising a first line 450 corresponding to the speed of the vehicle 800 (the speed of the vehicle is on the y-axis in the graph, and the time is on the x-axis), and bars 550 indicating injections of pressurized gas (each injection 550 is symbolized by a corresponding bar 550 extending with a unity magnitude along the y-axis in the graph, and the time is on the x-axis). For example, as shown in FIG. 5, for two subsequent gears, a first gear shifting operation 501 may be executed (indicated by an clear interruption of the inclination of the first line, or a first hump of the first line), and subsequently a second gear shifting operation 503 may be executed (correspondingly indicated by an clear interruption of the inclination of the first line, or a second hump of the first line). Thus, the control unit 50 may be configured to identify such first and second gear shifting operations 501, 503. Moreover, the control unit 50 may be configured to initiate injection of pressurized gas 552 from the tank 40 to drive the turbocharger turbine 22 between the first gear shifting operation 501 and the second gear shifting operation 503. Hereby, a suitable timing of using pressurized gas from the tank 40 to drive the turbocharger turbine 22 is provided. As seen in FIG. 5, several gear shifting operations 500, and several injections of pressurized gas 550 from the tank 40, may be carried out repeatedly and alternately, e.g. in response to an ascent of the road 900.

Turning back to FIG. 3, for example embodiments in which the turbocharger system 10 comprises a compressor 42 for supplying pressurized gas to the tank 40, the control unit 50 is typically configured to initiate charging of the tank 40 with pressurized gas using the compressor 42. As an alternative to charging the tank 40 with the compressor 42, the turbocharger system 10 may comprises an inlet pressure pipe 47 and an inlet pressure pipe valve 48 configured to control supply of pressurized gas to the tank 40 via the inlet pressure pipe 47. Correspondingly, for such embodiments, the control unit 50 is configured to initiate charging of the tank 40 with pressurized gas by opening the inlet pressure pipe valve 47. For example, the control unit 50 may be configured to initiate charging of the tank 40 prior to initiating injecting of pressurized gas from the tank 40 to drive the turbocharger turbine 22. Moreover, the control unit 50 may be configured to terminate charging of the tank 40 via the inlet pressure pipe 47 by closing the inlet pressure pipe valve 48. As seen in FIG. 3, the inlet pressure pipe 47 may be connected to the exhaust manifold 102, and the tank 40 may thus be charged with exhaust gases e.g. at blowdown peaks where the pressure of the exhaust gases is relatively high, and later used when the pressure of the exhaust gases is relatively low. Alternatively, the inlet pressure pipe 47 may be connected to another source of pressurized gas.

Regardless of whether a compressor 42, or the inlet pressure pipe 47, is used to charge the tank 40, the control unit 50 is typically configured to terminate charging of the tank 40 when the tank 40 is charged to its nominal working pressure, or alternatively when the tank 40 is charged to an excess pressure compared to the nominal working pressure of the tank 40.

Moreover, the control unit 50 may e.g. be configured to release pressurized gas from the tank 40 for a pre-set time period of at least 1 second, or between 1 second and 5 seconds. For example, the size of the tank, and the release of pressurized gas via the valve 44, may be sized and dimensioned such that the tank 40 is fully depleted or emptied after e.g. 5 seconds. Thus, the turbocharger system 10, and the turbocharger turbine 22, may be operated by pressurized gas from the tank 40 e.g. for at least 5 seconds. When the tank 40 has been at least partly depleted or emptied, it may be recharged using e.g. the compressor 42.

The present invention also relates to a method for controlling a turbocharger system, as e.g. the turbocharger system 10 shown in FIG. 3, fluidly connected to an exhaust manifold of a combustion engine in a vehicle (also shown in FIG. 3). Thus, the present invention will hereafter be described with reference to the above described combustion engine 100, and turbocharger system 10 in a non-limiting way, with reference to the flow-chart in FIG. 4 (hence, the reference numerals of FIG. 1, FIG. 2 and FIG. 3 are used below when describing the steps of the method in the flow-chart in FIG. 4).

In a first step 601, the coming drive conditions of the vehicle 800 are predicted. The coming drive conditions may be predicted using information from at least one of the following: a global positioning system, a dead reckoning system and a topographical data map. As stated previously, the predicted drive conditions may comprise, or be comprised of, predicted or coming road conditions, such as e.g. road types, road speed limits, road topography (e.g. descent or ascent of the road 900), turns, intersections, etc. Additionally or alternatively, the predicted drive conditions comprise, or is comprised of, predicted or coming vehicle operational conditions, or vehicle operational modes, such as e.g. start-up, acceleration from standstill, engine braking etc. Moreover, the vehicle position and/or a vehicle movement parameter, such as e.g. vehicle speed, the direction of travel of the vehicle 800, acceleration or deceleration of the vehicle 800, may be used to predict the coming drive conditions. Hereby the time, or occurrence, of a certain predicted drive condition may be determined.

As mentioned previously, according to one embodiment the turbocharger system 10 comprises a valve 44 for controlling the release of pressurized gas from the tank 40. Thus, in an optional second step 603, the valve 44 is operated to release pressurized gas from the tank 40. As previously described, the valve 44 may be connected to a valve pipe 46 which in turn is connected to supply the pressurized gas to the exhaust manifold 102, the exhaust manifold pipe 108, the turbocharger turbine 22 casing, the inlet manifold 104, the turbocharger compressor 24 casing, and/or the inlet manifold pipe 106. The valve 44 may be operated in such a way that the pressurized gas is released from the tank 40 during at least 1 second, such as e.g. between 1 second and 5 seconds.

In a third step 605, pressurized gas from the tank 40, e.g. via the valve 44, is injected to drive the turbocharger turbine 22, such that the turbocharger turbine 22 is at least partly driven by the pressurized gas, in response to the predicted drive conditions. For example, required combustion engine parameters, or required combustion engine output (e.g. load, or torque or torque response) may be determined in relation to the predicted drive conditions, and thus the injection of pressurized gas from the tank 40 to drive the turbocharger turbine 22 may be controlled to respond, e.g. be controlled to assist if needed, to such required combustion engine parameters, or required combustion engine output. The third step 605 of injecting pressurized gas from the tank 40 may at least partly be dependent of an engine speed increasing action of the combustion engine and/or a gear shifting operation (as e.g. described in FIG. 5).

In a fourth step 607, carried out as an alternative to the third step 605, or in addition to the third step 605 (for example, prior to the third step 605), the tank 40 is charged with pressurized gas in response to the predicted drive conditions, wherein the predicted drive conditions are indicative of the need for injection of pressurized gas from the tank 40. That is, for the predicted drive conditions and the corresponding required combustion engine parameters, or required combustion engine output, the need for injection of pressurized gas from the tank 40 can be determined, and the tank 40 can be charged accordingly, prior to injecting pressurized gas from the tank 40. As previously described, the tank 40 may be charged by using e.g. a compressor, or by charging the tank with exhaust gas or pressurized gas from another source.

The fourth step 607, may comprise a first sub-step 609 of charging the tank 40 to at least the nominal working pressure of the tank and/or charging the tank 40 with an excess pressure compared to a nominal working pressure of the tank 40.

Preferably, steps 601 to 607 may be repeated, and the fourth step 607 of charging the tank 40, the third step 605 of initiating pressurized gas, may be carried out repeatedly and alternately. That is, for each injection 605, or for each certain reduction of pressurized gas in the tank 40 (e.g. based on a threshold of 60% or 70% of the nominal working pressure of the tank), the tank 40 is charged 607, or re-charged.

The control unit 50 may for example be manifested as a general-purpose processor, an application specific processor, a circuit containing processing components, a group of distributed processing components, a group of distributed computers configured for processing, a field programmable gate array (FPGA), etc. The control unit 50 may further include a microprocessor, microcontroller, programmable digital signal processor or another programmable device. The control unit 50 may also, or instead, include an application specific integrated circuit, a programmable gate array or programmable array logic, a programmable logic device, or a digital signal processor. Where the control unit 50 includes a programmable device such as the microprocessor, microcontroller or programmable digital signal processor mentioned above, the processor may further include computer executable code that controls operation of the programmable device.

Correspondingly, the GPS module 60 may for example include a GPS receiver, a microprocessor, microcontroller, programmable digital signal processor or another programmable device. The GPS module 60 may also, or instead, include an application specific integrated circuit, a programmable gate array or programmable array logic, a programmable logic device, or a digital signal processor arranged and configured for digital communication with the control unit 50. Where the control unit 50 includes a programmable device such as the microprocessor, microcontroller or programmable digital signal processor mentioned above, the GPS module 60 may simply comprise a GPS receiver and circuits for digital communication with the control unit 50.

The processor (of the control unit 50 and/or the GPS module 60) may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 50 is connected to the various described features of the combustion engine 100 and the turbocharger system 10 such as e.g. the GPS module 60, and is configured to control system parameters. Moreover, the control unit 50 may be embodied by one or more control units, where each control unit may be either a general purpose control unit or a dedicated control unit for performing a specific function.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be understood that the control unit 50 may comprise a digital signal processor arranged and configured for digital communication with an off-site server or cloud based server. Thus data may be sent to and from the control unit 50.

It is to be understood that the present invention is not limited to the embodiments described above and illustrated in the drawings; rather, the skilled person will recognize that many changes and modifications may be made within the scope of the appended claims. Thus, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling a turbocharger system fluidly connected to an exhaust manifold of a combustion engine in a vehicle, said turbocharger system comprising a turbocharger turbine operable by exhaust gases from said exhaust manifold, and a tank with pressurized gas, said tank being fluidly connectable to said turbocharger turbine, said method comprising the steps of:
predicting the coming drive conditions of the vehicle,
injecting pressurized gas from said tank to drive said turbocharger turbine such that the turbocharger turbine is at least partly driven by said pressurized gas, in response to the predicted drive conditions,
wherein the predicted drive conditions are indicative of the need for injection of pressurized gas from said tank,
where the step of injecting pressurized gas from the tank is dependent on a gear shifting operation,
wherein said vehicle further comprises a gear box or transmission system coupled to the combustion engine, wherein said method comprises the step of:
executing a first gear shifting operation, and subsequently executing a second gear shifting operation, and
wherein the step of injecting pressurized gas from said tank to drive said turbocharger turbine is carried out between the step of executing a first gear shifting operation and the step of executing a second gear shifting operation.

2. A method according to claim 1, comprising the step of: charging said tank with pressurized gas in response to the predicted drive conditions.

3. A method according to claim 1, wherein said tank is charged with pressurized gas using a compressor or exhaust gas from said combustion engine.

4. A method according to claim 3, wherein said step of charging the tank with pressurized gas comprises charging the tank to at least the nominal working pressure of the tank.

5. A method according to claim 3, wherein said step of charging the tank with pressurized gas comprises charging the tank with an excess pressure compared to a nominal working pressure of the tank.

6. A method according to claim 3, wherein said step of charging the tank with pressurized gas is carried out prior to the step of injecting pressurized gas from said tank to drive said turbocharger turbine.

7. A method according to claim 1 wherein said step of predicting the coming drive conditions of the vehicle comprises using information from a global positioning system, a dead reckoning system or a topographical data map.

8. A method according to claim 1, wherein said step of injecting pressurized gas from said tank is at least partly dependent of an engine speed increasing action of the combustion engine or a gear shifting operation.

9. A method according to claim 1, wherein said turbocharger system further comprises a valve for controlling the release of pressurized gas from said tank, and a turbocharger compressor driven by said turbocharger turbine, and said combustion engine comprises an inlet manifold fluidly connected to said turbocharger compressor, wherein said method comprises the step of operating said valve to release pressured gas from said tank to the exhaust manifold of the combustion engine, to an exhaust manifold pipe arranged between the exhaust manifold and the turbocharger turbine, to the turbocharger turbine casing, to the inlet manifold of the combustion engine, to the turbocharger compressor casing, or to an inlet manifold pipe arranged between the inlet manifold and the turbocharger compressor.

10. A control unit configured to perform the steps of the method according claim 1.

11. A turbocharger system for use together with a combustion engine in a vehicle, said combustion engine having an exhaust manifold, said turbocharger system comprising:
a turbocharger turbine operable by exhaust gases from said exhaust manifold,
a tank comprising pressurized gas, said tank being fluidly connectable to said turbocharger turbine, and
a control unit
characterized in that the control unit is configured to:
predict or receive data indicative of the coming drive conditions of the vehicle,
initiate injection of pressurized gas from said tank to drive said turbocharger turbine such that the turbocharger turbine is at least partly driven by said pressurized gas, in response to the predicted drive conditions, wherein the predicted drive conditions are indicative of the need for injection of pressurized gas from said tank,
where the injection of pressurized gas from the tank is dependent on a gear shifting operation,
wherein said vehicle further comprises a gear box or transmission system coupled to the combustion engine, wherein said control unit is configured to:
identify a first gear shifting operation, and subsequently identify a second gear shifting operation, and
initiate the injection of pressurized gas from said tank to drive said turbocharger turbine such that the turbocharger turbine is at least partly driven by said pressurized gas between the identification of the first gear shifting operation and the second gear shifting operation.

12. A turbocharger system according to claim 11, wherein the control unit is configured to:
initiate charging of the tank with pressurized gas in response to the predicted drive conditions.

13. A turbocharger system according to claim 11, comprising a compressor for supplying pressurized gas to said tank, wherein said control unit is configured to initiate charging of said tank with pressurized gas using said compressor or wherein the turbocharger system comprises an inlet pressure pipe and an inlet pressure pipe valve configured to control supply of pressurized gas to said tank via said inlet pressure pipe, wherein said control unit is configured to initiate charging of said tank with pressurized gas by opening said inlet pressure pipe valve.

14. A turbocharger system according to any one of claim 11, wherein said control unit is configured to terminate charging of said tank when said tank is charged to its nominal working pressure, or wherein said control unit is configured to terminate charging of said tank when said tank is charged to an excess pressure compared to the nominal working pressure of the tank.

15. A turbocharger system according to claim 11, wherein said control unit is configured to initiate charging of the tank prior to initiating injecting of pressurized gas from said tank to drive said turbocharger turbine.

16. A turbocharger system according to claim 11, wherein said control unit is configured to predict the coming drive conditions of the vehicle by using information from a global positioning system, a dead reckoning system or a topographical data map.

17. A turbocharger system according to claim 11, wherein said turbocharger system further comprises a valve for controlling the release of pressurized gas from said tank, and a turbocharger compressor driven by said turbocharger turbine, and said combustion engine comprises an inlet manifold fluidly connected to said turbocharger compressor, wherein said valve controls the release of pressurized gas from said tank to the exhaust manifold of the combustion engine, to an exhaust manifold pipe arranged between the exhaust manifold and the turbocharger turbine, to the turbocharger turbine casing, to the inlet manifold of the combustion engine, to the turbocharger compressor casing, or to an inlet manifold pipe arranged between the inlet manifold and the turbocharger compressor.

18. A vehicle comprising a turbocharger system according to claim 1.

19. A computer program comprising program code means for performing the steps of claim 1, when said program is run on a computer.

20. A computer readable medium carrying a computer program comprising program code means for performing the steps of claim 1, when said program product is run on a computer.

\* \* \* \* \*